July 21, 1925.
F. DRAVLAND ET AL
1,546,438
HARROW
Filed April 14, 1924
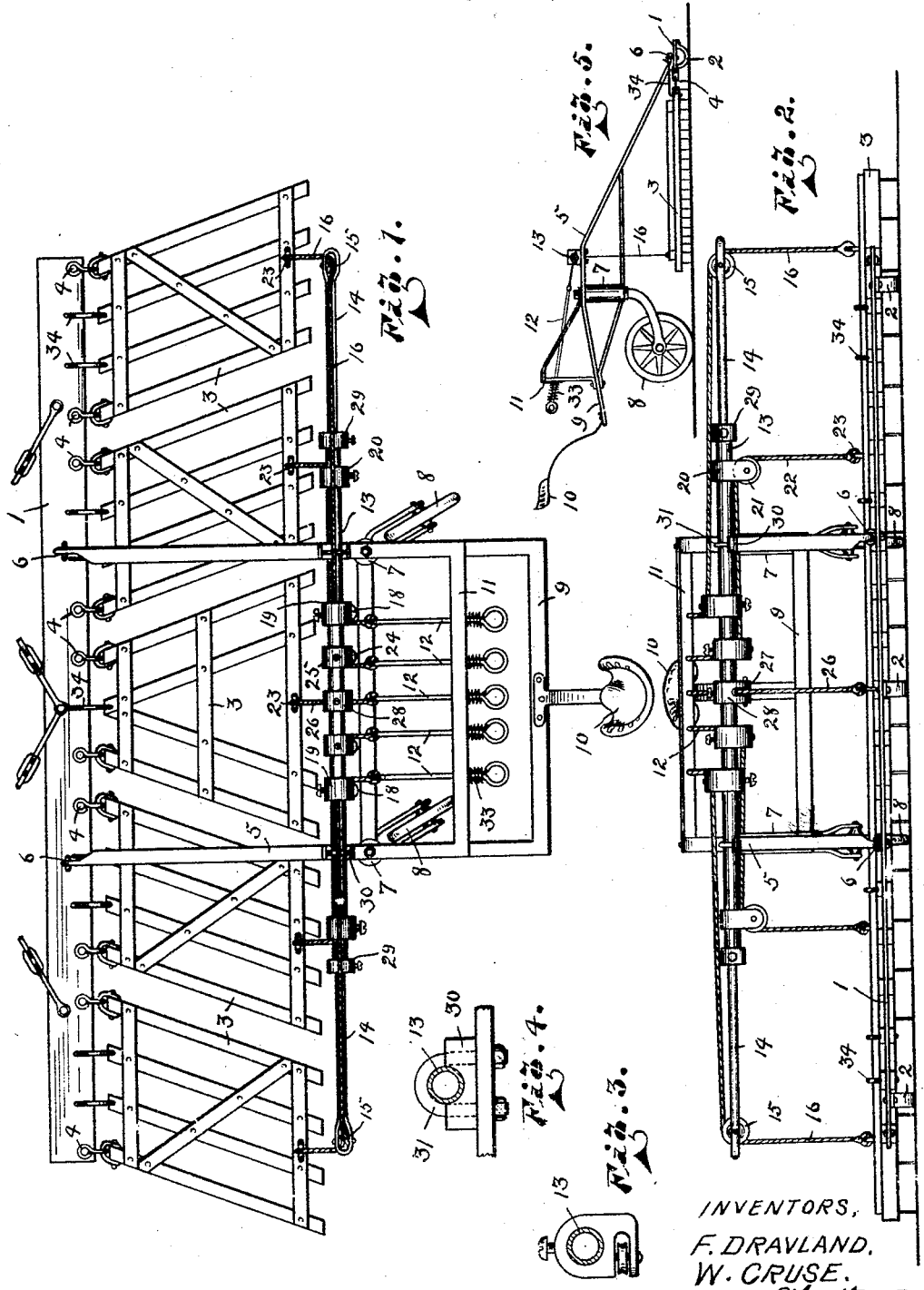
INVENTORS,
F. DRAVLAND.
W. CRUSE.

Patented July 21, 1925.

1,546,438

UNITED STATES PATENT OFFICE.

FREDRICK DRAVLAND AND WILLIAM CRUSE, OF DULUTH, MINNESOTA.

HARROW.

Application filed April 14, 1924. Serial No 706,248.

*To all whom it may concern:*

Be it known that we, FREDRICK DRAVLAND and WILLIAM CRUSE, each a citizen of the United States, residing at Duluth, in the county of St. Louis and State of Minnesota, have invented certain new and useful Improvements in Harrows, of which the following is a specification, reference being had therein to the accompanying drawing.

This invention relates to agricultural implements and has special reference to a harrow or drag in which a plurality of sections of drags are employed and vertically adjustable independently for cleaning purposes; the present invention having particular reference to means for raising and lowering the harrow sections.

The principal object is to provide simple means for raising and lowering the rear end of the harrow sections, and one that will be convenient of access to the operator of the harrow.

Other objects and advantages will appear in the further description of the invention.

Referring now to the accompanying drawing in which like reference characters indicate like parts:

Figure 1 is a top plan view of a multi-section harrow equipped with our improved section lifting device;

Figure 2 is a front elevation of Figure 1;

Figure 3 is an enlarged side elevation of one of the adjustable sheave blocks through which the section lifting ropes pass;

Figure 4 is an enlarged side elevation of the mounting for the rope supporting shaft; while Figure 5 is a reduced side elevation of the completely assembled device.

The harrow to which we have shown our device attached is of common construction, having a floating tow beam 1 which may be provided with shoes or skids 2 for holding it slightly above the ground and to which tow beam are attached the harrow sections 3 as at 4, the same being any well known form of link and clevis connection.

As a means for supporting the section lifting device as well as the operator, we provide a metal fabricated chassis 5 surmounting the harrow centrally thereof, the forward ends of the chassis being flexibly attached in any desired manner to the upper face of the tow beam, as at 6—6. On either side of the chassis and just rearwardly of the harrow sections are vertical journals 7 in which are mounted the shanks of the castor wheels 8, there being two of these for the support of the body portion of the chassis so that the same is free to turn with the harrow in any direction desired. Above and extending rearwardly of the wheels 8 is a rectangularly shaped light frame structure 9 and in the center and extending rearwardly thereof is the driver's seat 10. In front of this seat is an upstanding frame like instrument board 11 which carries therein the section operating rods 12 of which there is one for each section of harrow.

Just forwardly of the wheel mountings of the chassis is a tubular transverse shaft 13, in either end of which is telescopically mounted a smaller shaft 14. The shafts 14 extend laterally to a point centrally of the outermost sections 3 of the harrow and just rearwardly thereof, and in the outboard ends of the extensions 14 are carried sheaves 15 over each of which the line 16, attached as at 17 centrally to the free end of the outermost sections 3, extend. Each of these lines 16 is carried inwardly towards the center of the chassis 5, where it passes around a sheave 18 mounted in the adjustable block 19 fixed upon the tubular shaft 13 and is attached to the end of its respective adjusting rod 12. A sheave carrying block 20, similar to the block 19, is mounted adjacent the ends of the shaft 13 one upon either end thereof, each carrying a sheave 21 over which the line 22 is payed, said line being attached as at 23 to the intermediate harrow sections and thence over the sheave 21 to a similar sheave 24 in the block 25 on the shaft 13, eventually being attached to its respective operating rod 12.

The centermost harrow section 3 is attached in like manner by the use of the line 26 passing upwardly over a sheave 27 in the block 28 and to the operating rod 12 so that in this manner each harrow section 3 may be lifted independently by pulling the respective operating rods 12, and the extensions 14 of the sheave supporting shaft may be adjusted by virtue of their telescopic connection with the shaft 13, a collar and set screw being provided for such adjustment, as at 29, to accommodate any width of harrow desired, and an additional or less number of sheave carrying blocks to accommodate the number of sections in the harrow; or a three section harrow may be operated upon a single tubular shaft without the extensions 14, as is obvious.

The mounting of the shaft 13 upon the chassis we prefer to accomplish by the use of blocks 30 forming saddles in which the shaft 13 rests with the U-bolt 31 surrounding same and passing downwardly through the frame of the chassis where it may be drawn up tightly and thus held in position. The sheave carrying blocks, an enlarged view of which is illustrated in Figure 3, may be adjusted longitudinally or rotatably upon the shaft to accommodate the draft of the line therethrough.

The embodiment of our invention which we have shown is applied to a horse drawn harrow, but in the event of same being operated by a tractor it may become desirable to extend the harrow lifting lines and rods to the rear of the tractor in which event it is quite obvious that the only change necessary would be turn shaft 13 end for end and extend the lines and operating rods 12 to the rear of the tractor.

While we have described the operating mechanism only of the centermost and two right hand sections 3 of the harrow, it is apparent that the description applies to the opposite side thereof, as the mechanism is identical.

As a means for maintaining the section operating lines taught at all times, there is interposed upon the rods 12 an expansive spiral spring 33 between the operating loop on the ends thereof and the instrument board 11.

To the forward end of each section 3 is bolted one or more forwardly projecting rods 34, they being bent up at their forward free ends over the tow board 1 and normally slightly above same, so that when the rear end of a section is lifted as above described by the operating line the arcuate end of these shoes will engage the upper surface of the tow board and thus afford means for preventing the nose of the section digging into the ground, by slightly lifting same.

While we have shown a particular type of harrow, it is evident that the lifting mechanism is equally applicable to varied types of harrows.

From the foregoing it is evident that we have produced an exceedingly simple and practical attachment for harrows, not only in respect to a lifting device for the cleaning and freeing of the individual sections from obstructions but also a convenient and practical form of support for the driver or operator of the harrow, and one that provides against the weight of the operator being applied thereto when riding.

Having thus described our invention, what we claim and desire to secure by Letters Patent, is:

1. The combination with a multi-section harrow having a tow board common to all of the sections and to which the sections are attached, and means above the rearmost free ends of the sections for raising and lowering same, of means at the forward ends of the sections cooperatively engageable with the tow board for raising the forward ends of the sections simultaneously with the raising of the rearmost ends of the sections.

2. A harrow of the character described comprising in combination a plurality of harrow sections, a tow board common to all of the sections to which they are attached having ground engaging shoes fixed to same, a carriage chassis above the rearmost free ends of the harrow sections, said chassis having a forwardly and downwardly inclined rigid portion pivotally attached to the tow board, means carried by the chassis for selectively raising the free ends of the harrow sections, means at the forward ends of the sections normally out of engagement with the tow board for raising the forward ends of same simultaneously with the raising of the rearmost ends of the sections.

3. A harrow of the character described comprising in combination a plurality of harrow sections, a tow board common to all of the sections to which they are attached having ground engaging shoes fixed to same, a carriage chassis above the rearmost free ends of the harrow sections, said chassis having a forwardly and downwardly inclined rigid portion pivotally attached to the tow board, means carried by the chassis for selectively raising the free ends of the harrow sections, shoe like means carried upon the forward end of each section extending forwardly and above the tow board for engagement with the upper face of the tow board when the rearmost ends of the sections are lifted for simultaneously lifting the forward ends of the sections.

In testimony whereof we hereunto affix our signatures in the presence of two witnesses.

FREDRICK DRAVLAND.
WILLIAM CRUSE.

Witnesses:
S. C. BRONSON,
S. GEO. STEVENS.